United States Patent [19]

Naseer et al.

[11] Patent Number: 5,253,291
[45] Date of Patent: Oct. 12, 1993

[54] HYBRID BALANCE AND COMBINATION CODEC FILTER CIRCUIT

[75] Inventors: Absar Naseer, Mesa; Michael Warner, Phoenix; Lalit O. Patel, Mesa, all of Ariz.

[73] Assignee: AG Communication Systems Corporation, Phoenix, Ariz.

[21] Appl. No.: 599,533

[22] Filed: Oct. 18, 1990

[51] Int. Cl.⁵ .............................................. H04B 3/20
[52] U.S. Cl. .................................. 379/406; 379/399; 379/410
[58] Field of Search ............... 379/399, 400, 401, 406, 379/410

[56] References Cited
U.S. PATENT DOCUMENTS
4,984,266 1/1991 Smith ................................. 379/399

Primary Examiner—James L. Dwyer
Assistant Examiner—M. Shehata
Attorney, Agent, or Firm—Gregory G. Hendricks

[57] ABSTRACT

A hybrid balance and combination codec filter circuit used in a subscriber line interface circuit over which a connection is established between a digital switching network and a subscriber instrument. The hybrid balance and combination codec filter circuit in combination includes a transmit section that converts differential voltage audio signals representing voice transmissions transmitted from the subscriber instrument into Pulse Code Modulated (PCM) encoded digital data, for transmission to the digital switching network. A receive section converts PCM encoded digital data representing voice signals switched through the digital switching network into differential voltage audio signals for transmission to the subscriber instrument. An included hybrid balance and echo cancellation section connected between the transmit section and the receive section reshapes the audio band signals output by the receive section. The reshaped audio band signals are applied to the transmit section, where they cancel any reflected audio band signals not completely transferred to the terminating impedance. Finally, an impedance section provides an audio band feedback signal between the transmit section and the receive section for synthesizing a source impedance that is matched to the impedance of the tip and ring leads of the subscriber loop.

11 Claims, 3 Drawing Sheets

HYBRID BALANCE AND COMBINATION CODEC FILTER CIRCUIT

CROSS-REFERENCE TO RELATED APPLICATIONS

Cross reference is made to the following related Application entitled: "An Enhanced Subscriber Line Interface Circuit", Ser. No. 07/599,535 filed Oct. 18, 1990; "An Enhanced High Voltage Line Interface Circuit", U.S. Pat. No. 5,175,764 issued Dec. 29, 1992; "An Over-Current Detector Circuit For An Enhanced Subscriber Line Interface", U.S. Pat. No. 5,163,090 issued Nov. 10, 1992; and "A Ringing Signal Control Circuit For An Enhanced Subscriber Line Interface", Ser. No. 07/599,534 filed Oct. 18, 1990; filed on the same date as the instant Application, and having a common assignee.

BACKGROUND OF THE INVENTION

1. Field of the Invention

The present invention relates in general to the field of telecommunications, and more particularly, to a Hybrid balance and Combination codec filter (HCOMBO) circuit that performs analog-to-digital and digital-to-analog conversion, impedance matching and hybrid balance in a subscriber line interface.

2. Description of the Prior Art

Subscriber line interface circuits (SLIC) are customarily found in the central office exchange of a telecommunications network. The SLIC weds the digital switching network of the central office exchange to a plurality of analog subscriber lines. The analog subscriber lines connect to subscriber stations or instruments found at subscriber locations remote from the central office exchange.

The SLIC functions to supply power to a subscriber station and to transmit and receive voice signals between the digital switching network and the subscriber station.

Modern solid state SLICs are constructed using specialized integrated circuits. This construction dispenses with the need for inductive components in the analog end of the interface. The operating environment of the SLIC includes a necessity to provide high voltages and currents, used for analog voice transmission and substation signalling, as well as, low voltage digital logic signals used for the transmission of digital data between the SLIC and the digital switching network.

The translation of the analog voice signals to PCM encoded digital signals and the interface of the PCM digital signals between the SLIC and the digital switching system is accomplished using a specialized integrated circuit known as a CODEC/FILTER. The CODEC/FILTER converts analog voice signals received from a subscriber line to PCM encoded digital signals. Similarly, PCM encoded digital signals from the digital switching system are converted into analog voice signals for transmission on the subscriber line. One such device is the commercially available as the CODEC/FILTER COMBO ™, TP305X family of COMBO devices manufactured by the National Semiconductor Company.

These COMBO circuits combine transmit bandpass and receive lowpass channel filters with a companding PCM encoder and decoder that employs either A-law or μ-law sampling to convert analog voice signals into 8-bit digital data representations of the voice signals. An included PCM interface transfers the digital voice representations to and from the digital switching network.

Presently known SLIC architectures include in combination a High Voltage Line Interface (HVSLIC) IC with a Low Voltage Line Interface (LVSLIC) IC and a COMBO IC. In this combination the HVSLIC provides power to the subscriber instrument and receives and transmits analog voice signals. One such HVSLIC is described in U.S. patent application Ser. No. 445,516, filed Dec. 4, 1989, entitled "High Voltage Subscriber Line Interface Circuit", having a common assignee with the present invention.

The SLIC must also provide certain signalling and detection functions in order to allow the digital switching system to communicate with a subscriber station. These signaling and detection functions include ringing signal control, ring-trip and loop sense detection as well as detection of abnormal loop conditions.

The LVSLIC IC is normally tasked to provide the above mentioned functions and also to provide the hybrid balance network (two-four wire conversion) and synthesized source impedance for the HVSLIC. The LVSLIC reports the status of the subscriber loop and the SLIC circuit to a central controller of the digital switching system.

One such LVSLIC circuit is described in U.S. patent application Ser. No. 445,826, filed Dec. 4, 1989, entitled "Control Circuit For A Solid State Telephone Line Circuit", having a common assignee with the present invention. The LVSLIC circuit communicates via a data and address bus with a central controller of the digital switching system. Information pertaining to the status of the SLIC and the subscriber line are transmitted from the LVSLIC to the central controller. Operating commands from the central controller are received by the LVSLIC for execution by the SLIC.

The above identified SLICs conform to a circuit architecture that connects in combination an integrated circuit HVSLIC, an LVSLIC, and CODEC/FILTER with discrete components that provide subscriber line configuration and protection. The combination just described interfaces a single subscriber line to the digital switching network of a central office exchange.

Such a SLIC is disclosed in U.S. patent application Ser. No. 445,517, filed Dec. 4, 1989, entitled "A Solid State Telephone Line Circuit", having a common assignee with the present invention.

A SLIC circuit is usually one circuit of a plurality of SLICs that are assembled on a line card. The line card connects a plurality of subscriber lines to the digital switching network. Typically, eight or more SLICs can be found on a single line card. However, each SLIC is susceptible to catastrophic damage due to the environment of the associated subscriber line, such as lightning strikes, power surges, etc. A failure of one SLIC circuit necessitates the replacement of the line card. It is advantageous therefore to be able to replace only those circuits of the line card that are damaged by the aforementioned environmental factors and not the entire line card.

Further, since the LVSLIC acts primarily as a local controller and signal detector between the central controller of the digital switching system and the HVSLIC and COMBO, a certain amount of economy in circuit components can be realized by removing the LVSLIC from the above mentioned combination. By placing the LVSLIC in a more central location the LVSLIC can provide control and detection functions t two or more HVSLIC and COMBO circuits. The hybrid balance function and synthesis of the source impedance however, can not be shared among several circuits and therefore, must still remain a part of the HVSLIC, COMBO combination.

Accordingly, it is an object of the present invention to provide a hybrid balance and combination codec filter (HCOMBO) that provides a circuit that performs analog-to-digital and digital-to-analog conversion, impedance matching and hybrid balance for a subscriber line interface circuit.

SUMMARY OF THE INVENTION

The above and other objects, advantages, and capabilities are realized in a hybrid balance and combination codec filter circuit included in a subscriber line interface circuit. The subscriber line interface circuit is connected to a subscriber instrument via the tip lead and a ring lead of a subscriber loop and to a digital switching network via a PCM bus.

The hybrid balance and combination codec filter circuit of the present invention comprises in combination a transmit section that converts differential voltage audio signals representing voice transmissions transmitted from the subscriber instrument into Pulse Code Modulated (PCM) encoded digital data, for transmission to the digital switching network. A receive section receives and converts PCM encoded digital data representing voice signals switched through the digital switching network into differential voltage audio signals for transmission to the subscriber instrument.

A hybrid balance and echo cancellation section is connected between the transmit section and the receive section and is arranged to reshape the audio band signals output by the receive section. The reshaped audio band signals are applied to the transmit section, where they cancel any reflected audio band signals not completely transferred to the terminating impedance.

An impedance section is further provided which is connected between the transmit section and the receive section. The impedance section is disposed to provide an audio band feedback signal between the transmit section and the receive section for synthesizing a source impedance for the subscriber line circuit. The synthesized impedance matches the impedance of the tip and ring leads of the subscriber loop.

An included timing generator is arranged to develop an 8 KHZ and a 256 KHZ clock signal from a master clock signal provided by the subscriber line interface circuit. The clock signals are used by the transmit and receive section as well as the impedance section Finally, the hybrid balance and combination codec filter circuit of the present invention includes a precision voltage and current reference section. The voltage and current reference section includes an A/D converter voltage reference for providing a precision voltage reference to the transmit section. A D/A converter voltage reference for providing a precision voltage reference to the receive section and a current reference amplifier for providing a precision current reference to the subscriber line interface circuit.

BRIEF DESCRIPTION OF THE DRAWINGS

A better understanding of the invention may be had from the consideration of the following detailed description taken in conjunction with the accompanying drawings in which.

DESCRIPTION OF A PREFERRED EMBODIMENT

Figure 1:
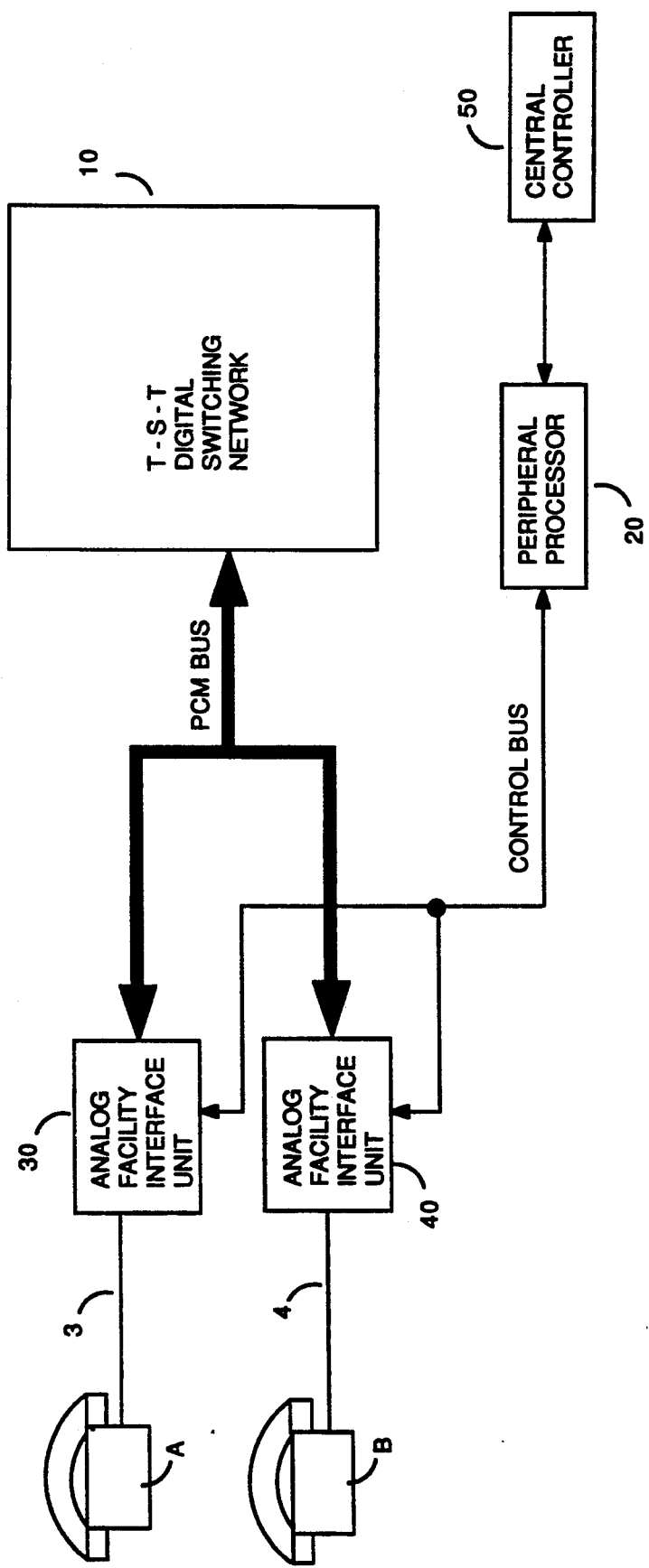
FIG. 1 is a simplified block diagram of a T-S-T central office switching system where the hybrid balance and combination codec filter circuit in accordance with the present invention is used to advantage.

Turning now to FIG. 1 of the included drawings a central office switching system or central office exchange of the type to which the invention is used to advantage is illustrated. The central office switching system includes a time division multiplexed Time-Space-Time (T-S-T) digital switching network 10 consisting minimally of an originating time switch and control unit, a space switch unit and a terminating time and control unit (not shown). The T-S-T network 10, connects to Analog Facility Interface Units (AFIU) 30 and 40 via a Pulse Code Modulation (PCM) bus. Each AFIU 30 and 40 allow, in this embodiment, the connection of subscriber lines 3 and 4 respectively to the network 10. Subscriber lines 3 and 4 further connect to subscriber telephone instruments A and B, respectively. The network 10 and each AFIU 30 and 40 is further connected to a Peripheral Processor (PP) 20, via a CONTROL BUS. The PP 20 maintains control of its environment by scanning the AFIUs 30 and 40 and controlling the associated network time and control units. The total control of the network connections within the network 10 is the responsibility of the Central Controller (CC) 50. That is, the central controller 50, via the PP 20, informs the time and control units of the time switch connections and also informs the space switch unit of the space switch connections. In addition the CC 50 maintains a data base of the call processing and administrative software for the central office switching system Analog voice signals from the transmitter of subscriber instrument A are transmitted to AFIU 30 where they are converted to PCM encoded digital signals. The PCM encoded digital signals are then inserted into available channels on the PCM BUS and transmitted to the digital switching network 10. Under control of the PP 20 the PCM encoded digital signals from subscriber A are switched through the digital switching network 10 and transmitted to AFIU 40 on the PCM BUS. The received PCM encoded digital signals are converted back to analog voice signals and transmitted via subscriber line 4 to the receiver of subscriber instrument B. The enhanced high voltage line interface circuit is located within the associated AFIUs.

Figure 2:
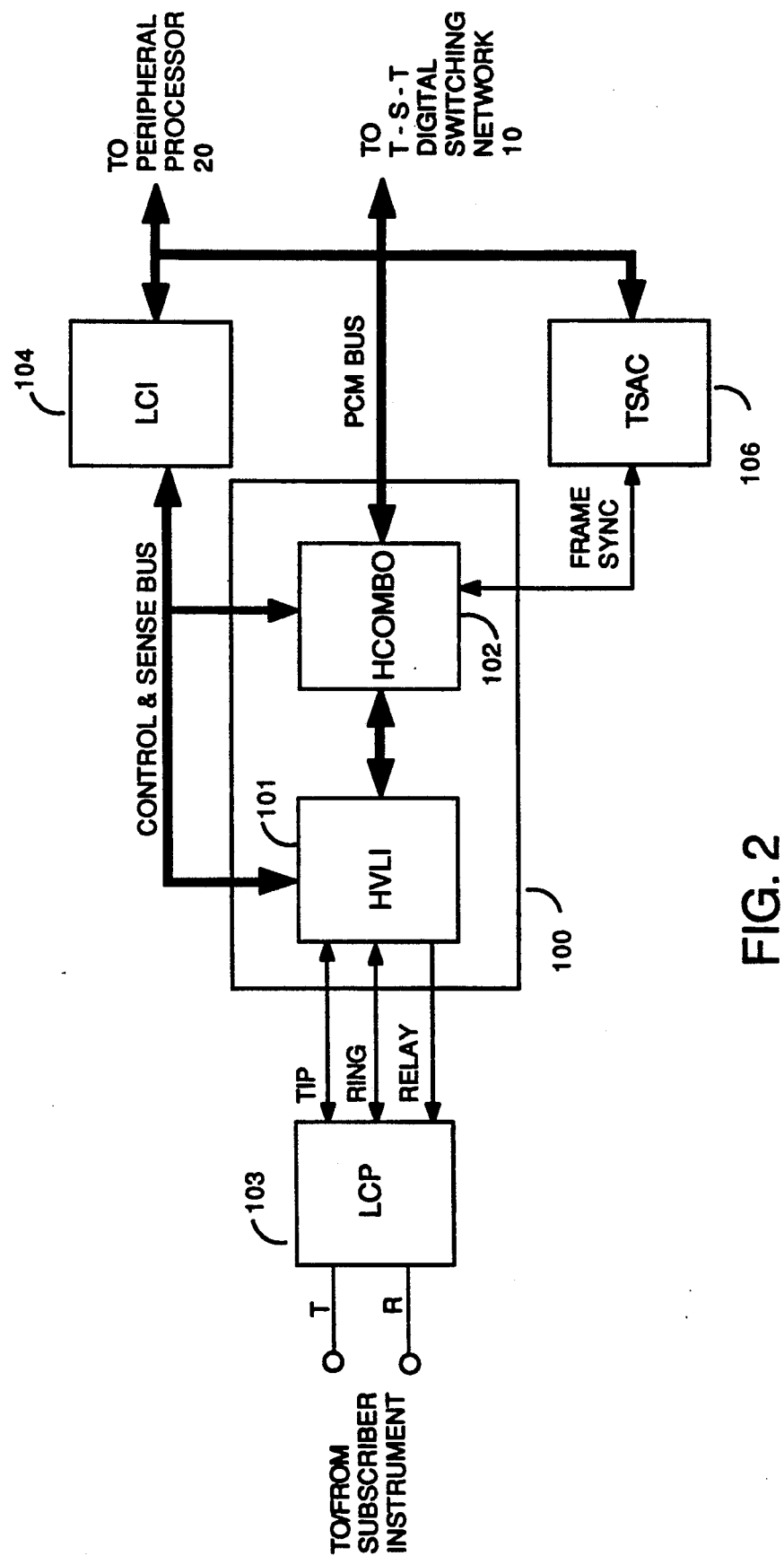
FIG. 2 is a block diagram showing the hybrid balance and combination codec filter circuit connected as part of a SLIC circuit in accordance with the present invention.

Turning now to FIG. 2 of the included drawings, a block diagram of a Subscriber Line Interface Circuit (SLIC) including the enhanced High Voltage Line Interface Circuit (HVLI) in accordance with the present invention is shown. The SLIC shown in FIG. 2 is arranged to interface a single subscriber line comprised of a Tip (T) lead and Ring (R) lead to the T-S-T digital switching network 10. The SLIC includes a thick-film transmission hybrid (XBRID) module 100. All critical analog components of the SLIC are contained on the XBRID module 100. XBRID module 100 includes an HVLI circuit 101 and a Hybrid Combo (HCOMBO) circuit 102 along with matched resistor networks and battery feed transistors (not shown). An HVLI 101 and a HCOMBO 102 form one functional SLIC that in combination provide most of the so-called BORSCHT-functions. In particular, the function of the subscriber power supply (Battery), line status monitoring (Signals, Supervision), analog-digital conversion (Coding), filter and two wire-four wire transition (Hybrid) are provide by the HVLI 101 and HCOMBO 102 of XBRID module 100.

In addition to powering the subscriber line, the HVLI 101 performs the essential two wire-four wire hybrid function of splitting the balanced signal on the T and R leads to separate transmit/receive paths. Differential audio signals are transmitted and received to/from the HCOMBO 102 via the HVLI 101. The HVLI 101 further performs loop supervision, ring trip detection, ground sensing and over-current detection. A more detailed explanation of the electrical structure and operation of HVLI 101 may be had by reference to co-pending U.S. Pat. No. 5,175,764 issued Dec. 29, 1992.

The HCOMBO 102 synthesizes the input impedance of the SLIC and performs hybrid balance echo cancelation. Additionally, the HCOMBO 102 converts the differential audio signals from the HVLI 101 to PCM encoded digital signals and from PCM encoded digital signals to differential audio signals.

The remainder of the BORSCHT functions are provided by the Line Configuration and Protection (LCP) circuit 103, located off the XBRID module 100. The LCP 103 appears between the T and R leads of a subscriber line and the HVLI 101. The LCP 103 functions to provide overvoltage protection (Overvoltage), the application of ringing current to the subscriber line (Ringing) and testing of the subscriber line as well as the SLIC (Test). The LCP 103 contains ring relays which under software control inject ringing current from a ringing generator (not shown) to the subscriber line. Similarly, the subscriber line as well as the SLIC can be isolated and tested via a test relay (not shown) that provides facility test (Out Test) and circuit test (In Test). The test relay allows the application of test signals from a test program which resides in the CC 50.

A Line Control Interface (LCI) circuit 104, performs all of the control and sense logic functions for the XBRID module 100. In particular, the LCI 104 functions to administer and control the ringing and test relays, hook status reporting, dial pulse detection, ring trip, ground sensing, and over-current detection. The LCI 104 connects its associated XBRID module 100 to PP 20 via a control and sense bus. A more detailed explanation of had by reference to co-pending U.S. Pat. No. 5,163,090 issued Nov. 10, 1992 and U.S. patent application Ser. No. 07/599,534 filed Oct. 18, 1990.

A PCM bus connects directly to HCOMBO 102 and is enabled by a Time Slot Assigner Circuit (TSAC) device 106. PCM digital data from the network, and PCM digital data to and from the HCOMBO 102, is transmitted via the PCM bus. The TSAC 106 functions to generate transmit and receive time frame sync pulses to its connected HCOMBO device 102. The network provides a required 1.544 MHz clock with a nominal 50% duty cycle for the purpose of shifting PCM data in and out of the HCOMBO 102 data registers. The HCOMBO 102 also requires a frame sync, that is generated by the TSAC 106. A frame (125 μsec) provides for 24 eight bit PCM channels with one framing bit for synchronization. One such TSAC device is the TP3155 Time Slot Assigner Circuit manufactured by the National Semiconductor Corporation.

Figure 3:
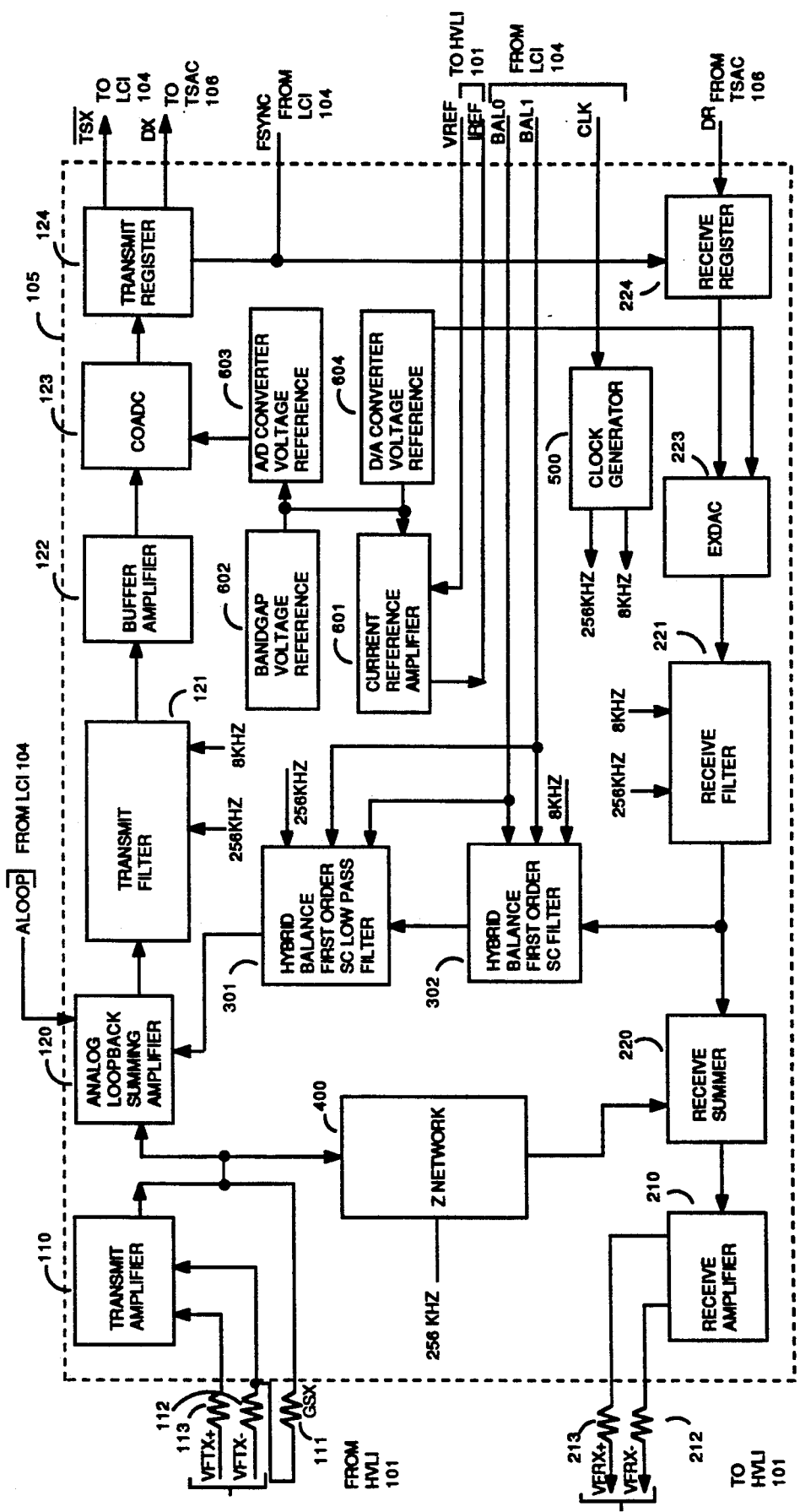
FIG. 3 is a functional block diagram of the hybrid balance and combination codec filter circuit of the present invention.

Turning now to FIG. 3 of the included drawings, the HCOMBO 102 circuit of present invention is shown. HCOMBO 102 is constructed as a monolithic Integrated Circuit (IC) for the purpose of performing analog-to-digital and digital-to-analog conversion, impedance matching and hybrid balance echo cancellation in a subscriber line interface circuit. The HCOMBO IC includes the functions within broken line 105.

The HCOMBO of the present invention comprises a transmit section, a receive section, an impedance matching section, a hybrid balance echo cancellation section, a timing generator and a precision voltage and current reference section.

The transmit section is arranged to convert differential voltage audio band signals representing voice transmissions from a subscriber instrument, to PCM encoded digital data. This section includes a Transmit Amplifier circuit 110, an Analog Loopback Summing Amplifier circuit 120, a Transmit Filter circuit 121, a Buffer Amplifier circuit 122, a Companding Analog-to-Digital Converter circuit (COADC) 123, and a Transmit Register circuit 124.

The receive section converts PCM encoded digital data representing voice signals from the digital switching system to differential voltage audio band signals for processing by the HVLI 101 and transmission to a subscriber instrument. This section includes a Receive Register circuit 224, an Expanding Digital-to-Analog Converter circuit (EXDAC) 223, a Receive Filter circuit 221, a Receive Summer circuit 220, and a Receive Amplifier circuit 210.

The hybrid balance section connected between the transmit section and the receive section reshapes the audio band signals output from the Receive Filter circuit 221. This provides line balance and echo cancellation required by 2-4 wire conversions. This section includes a Hybrid Balance First Order Switched Capacitor Low Pass Filter circuit 301 and a Hybrid Balance First Order Switched Capacitor Filter circuit 302. The hybrid balance section can be configured to operate with loaded, non-loaded and 900 Ohm+2.16 μF subscriber lines and is selectable through the BAL0 and BAL1 input lines.

The impedance section is connected between the transmit section and the receive section of HCOMBO 102 and provides feedback between the Transmit Amplifier 110 and the Receive Amplifier 210. This section is comprised of an impedance (Z) network circuit 400 that generates a synthesized source impedance for the transconductance drive amplifiers found in HVLI 101.

The timing generator section includes a Clock Generator circuit 500 that generates a 256 KHZ and 8 KHZ timing signal from the CLK input. The generated timing signals are used within the HCOMBO 102 by the other sections of the HCOMBO.

The precision voltage and current reference section provides all of the precision voltage reference signals required by the COADC 123 and EXDAC 223 circuits. This section is comprised of a Current Reference Amplifier 601, a Bandgap Voltage Reference circuit 602, an Analog-to-Digital Converter Voltage Reference circuit 603 and a Digital-to-Analog Converter Voltage Reference circuit 604. The current reference amplifier 601 further generates a precision current (IREF) which is output for use by the HVLI circuit 101.

With renewed reference to FIG. 3 of the included drawings, a more detailed explanation of the functions of the HCOMBO 102 will now be given.

The first element in the transmit section is the transmit amplifier circuit 110. The transmit amplifier circuit 110 includes an operational amplifier with provisions for gain adjustment using external resistors. A differential voltage audio band signal from HVLI 101 is input to the transmit amplifier circuit 110 via the non-inverting VFTX+ and inverting input VFTX− inputs of the transmit amplifier 110. The amplifier is configured to achieve a bandwidth sufficient to allow a closed loop gain of better than 20 dB across the audio passband. The output of the transmit amplifier circuit 110 is routed out of the HCOMBO 102 at GSX where it is connected via external resistor 111 to the VFTX− input. Resistor 111 along with resistor 112 are specified to adjust the gain of the transmit amplifier circuit 110. External resistors 112 and 113 also serve as input current protection resistors for the circuit. The output of transmit amplifier 110 is a single ended audio band signal which is applied to the analog loopback summing amplifier circuit 120 and the Z-network 400.

The analog loopback summing amplifier circuit 120 includes a summing amplifier (not shown) that sums the output signal of the transmit amplifier 110 with the output of the hybrid balance section. Additionally, the summing amplifier is arranged to open the analog path between the transmit amplifier 110 and the input summing junction of the summing amplifier. When input signal ALOOP is at a logic high level the analog path between the transmit amplifier and the analog loopback summing amplifier is isolated. This allows a PCM code to be input at DR, converted to an analog signal by the receive section and fed back to the transmit section through the hybrid balance section, converted to PCM, and output on the DX output.

The signal output from the analog loopback summing amplifier 120 is next applied to the transmit filter circuit 121. Circuit 121 consists of an RC active pre-filter followed by a sixth order lowpass switched-capacitor filter (not shown) clocked at 256 KHZ and a third order highpass switched-capacitor filter clocked at 8 KHZ (not shown). The clocks are derived from the clock generator circuit 500 and the master clock signal CLK.

The output of transmit filter 121 is buffered by buffer amplifier 122 before it is sent to the analog-to-digital converter COADC 123. The COADC 123 converts the input analog signal to an eight bit digital signal. The COADC 123 sample-and-holds the input analog signal companding in the $\mu$-law format. COADC 123 provides 13 bit resolution at low signal levels on the bottom chord of the companding characteristic. Any offset voltages due to the filters are cancelled by an included auto-zero circuit (not shown). The sampling of the filter 121 output begins on the rising edge of the frame sync pulse FSYNC and is followed by the analog-to-digital conversion.

The eight bit PCM digital data from the COADC 123 is loaded into the transmit register 124 for transmission to TSAC 106. The transmit register 124 is comprised of a parallel-to-serial converter circuit and an output driver circuit (not shown). The parallel-to-serial converter changes the eight bit PCM digital data from the COADC 123 from parallel to serial data format. The PCM serial data is clocked out of the transmit register 124 at output lead DX on the next eight CLK cycles immediately following the FSYNC signal. Signal TSX becomes active and pulses low for the eight CLK cycles as the 8-bit PCM digital data is shifted out of transmit register 124. The TSX signal is transmitted to LCI 104 signaling the LCI that analog-to-digital encoding is active. The encoded PCM digital data is output on DX to TSAC 106 for the subsequent transmission of the PCM digital data to the digital switching network.

An eight bit PCM coded representation of a voice signal from the digital switching system is input into HCOMBO 102 at the DR input of the receive register 224. The receive register 224 is comprised of a latch circuit and a serial-to-parallel converter circuit (not shown). The serial-to-parallel converter changes the eight bit PCM digital data received into a parallel data format. A rising edge on the frame sync pulse FSYNC causes the PCM serial data at DR to be latched into the receive register 224 on the next eight falling edges of CLK. The parallel PCM digital data is then clocked into the Expanding Digital-To-Analog (EXDAC) converter 223 for conversion into an analog signal. EXDAC 223 expands the decoded signal in accordance with the $\mu$-law decoding format.

The decoded signal from EXDAC 223 is next applied to the receive filter 221. The receive filter 221 consists of a seventh order band-pass switched-capacitor filter and a third order RC active post-filter. The seventh order band-pass filter includes circuits for correcting the sin x/x attenuation inherent in 8 KHZ sample-and-hold decoding.

The output of the receive filter is applied to the hybrid balance section and to the receive summer circuit 220. The receive summer 220 sums the output signals from the receive filter 221 with the synthesized impedance developed by the Z network 400. The summed output of receive summer 220 is finally applied to receive amplifier 210.

Receive amplifier 210 consists of a differential output driver amplifier that converts the single ended audio band input signal from the receive summer 220 into a differential voltage audio band signal. The output of receive amplifier 210 is transmitted to HVLI 101 on the non-inverting VFRX+ and inverting VFRX− output leads. Resistors 212 and 213 provide current protection for the drive circuits of the receive amplifier 210.

The hybrid balance section of HCOMBO 102 comprises a first order switched-capacitor filter 302 clocked at 8 KHZ and a first order switched-capacitor low-pass filter 301 clocked at 256 KHZ. The hybrid conversion is accomplished by passing a portion of the audio band signal from the receive filter 221 to the hybrid balance section prior to being output from the receive amplifier 210. The filters 302 and 301 modify the audio band signal amplitude and phase providing an output signal which is equal in amplitude and opposite in phase to the reflected audio band signal. The reflected audio band signal, is that portion of the receive amplifier 210 signal which when passed through the HVLI 101 circuit and the tip and ring leads, is not completely transferred to the terminating impedance. The reflected audio band signal returns through the HVLI 101 and back into the HCOMBO 102 through the transmit amplifier 110. The hybrid balance section output is summed with the output of the transmit amplifier 110 in the analog loopback summing amplifier 120. When the Hybrid balance section output and the reflected audio band signal are equal in amplitude and opposite in phase the signals cancel each other providing the maximum trans-hybrid loss.

The hybrid balance section of the present invention is implemented to function in three different system terminations. When a logic low signal is applied to the BAL0 and BAL1 inputs, the hybrid balance section is configured to provide the hybrid balance function in non-loaded tip and ring terminations. A logic high signal applied to BAL0 and a logic low signal applied to BAL1 configures the hybrid network to operate in loaded terminations. A logic low signal at BAL0 and a logic high signal at BAL1 configures the network to operate with 900 OHM+2.16 $\mu$F tip and ring terminations. Similarly, a logic high applied to both BAL0 and BAL1 configures the balance network section to operate in a 900 OHM+2.16 $\mu$F system. The logic input signals BAL0 and BAL1 are input from LCI 104.

The Z Network 400 synthesizes a source impedance of 900 OHM+2.16 $\mu$F to match the impedance of the tip to ring leads. The impedance is derived by feeding the output of the transmit amplifier 110 to the Z network 400. In such feedback impedance networks the gains of the amplifiers in the receive and transmit sections are matched with specific values of resistance and capacitance to achieve the desired input impedance. A better understanding of this method of synthesized impedance may be had by reference to U.S. Pat. No. 4,961,219, titled "A Circuit For Synthesizing An Impedance Across The Tip And Ring Leads Of A Telephone Line Circuit", having a common assignee as the present invention.

The output of the Z network is summed with the output of the receive filter 221 in receive summer 220. The summed output of receiver summer 220 is then input to the receive amplifier 210 for transmission of the audio band signals and synthesized input impedance to the HVLI 101.

The hybrid balance and combination codec filter just described can be manufactured as a single compact large scale integrated circuit using any of the presently known techniques used to build microcircuits. The hybrid balance and combination codec filter of the present invention also benefits from the increased reliability inherent in solid state construction as well the economies in labor cost and manufacture which are enjoyed by such devices.

It will be obvious to those skilled in the art that numerous modifications to the present invention can be made without departing from the scope of the invention as defined by the appended claims. In this context, it should be recognized that the essence of the invention resides in a hybrid balance and combination codec filter circuit that will effectively and efficiently perform analog-to-digital and digital-to-analog conversion, impedance matching and hybrid balance for a subscriber line interface circuit.

What is claimed is:

1. A hybrid balance and combination codec filter circuit connected in a subscriber line interface circuit, said subscriber line interface circuit connected to a subscriber instrument via a tip lead and a ring lead of a subscriber loop across which a subscriber loop impedance exists and to a digital switching network via a PCM bus, said hybrid balance and combination codec filter circuit comprising:

a transmit section for converting differential voltage audio transmit signals representing voice transmissions from said subscriber instrument into Pulse Code Modulated (PCM) encoded digital data for transmission to said digital switching network;

a receive section for converting PCM encoded digital data representing voice signals switched through said digital switching network to differential voltage audio receive signals for transmission to said subscriber instrument;

said subscriber loop and subscriber instrument being operable to reflect said digital voltage audio signals to said transmit section;

a hybrid balance and echo cancellation section connected between said transmit section and said receive section arranged to reshape the differential voltage audio receive signals output by said receive section and to apply said reshaped differential voltage audio receive signals to said transmit section, canceling any reflected differential voltage audio receive signals not completely transferred to the subscriber loop; and an impedance section connected between the transmit section and said receive section disposed to provide an audio band feedback signal between said transmit section and said receive section for synthesizing a source impedance for said subscriber line circuit that matches said subscriber loop impedance.

2. The hybrid balance and combination codec filter circuit as claimed in claim 1, wherein said transmit section comprises:

a transmit amplifier connected to said subscriber line interface circuit arranged to receive and amplify said differential voltage audio transmit signals and to convert said differential voltage audio transmit signals into single-ended audio transmit signals;

an analog loopback summing amplifier connected to said transmit amplifier, said analog loopback summing amplifier including a summing junction arranged to sum the single-ended audio transmit signals from said transmit amplifier with said reshaped digital voltage audio receive signals from said hybrid balance and echo cancellation section, cancelling any reflected digital voltage audio receive signals not completely transferred to the subscriber loop;

a transmit filter connected to said analog loopback summing amplifier arranged to selectively pass specific bands of said single-ended audio transmit signals output by said analog loopback summing amplifier;

a buffer amplifier connected to said transmit amplifier for buffering said single-ended audio transmit signals output by said transmit filter;

a Companding Analog-to Digital Converter (COADC) for converting said single-ended audio transmit signals output by said buffer amplifier into parallel formatted eight-bit digital transmit signals; and a transmit register connected to said COADC, said transmit register receiving said parallel formatted eight-bit digital transmit signals and converting said parallel formatted eight-bit digital transmit signals into serially formatted PCM transmit signals for transmission along said PCM bus to said digital switching network.

3. The hybrid balance and combination codec filter circuit as claimed in claim 2, wherein said receive section comprises:

a receive register connected to said PCM bus arranged to receive serially formatted PCM receive signals switched through said digital switching network, said receive register arranged to convert said serially formatted PCM receive signals into parallel formatted eight-bit digital receive signals;

an Expanding Digital-to-Analog Converter (EXDAC) circuit connected to said receive register, said EXDAC receiving parallel formatted said eight-bit digital receive signals from said receive register and arranged to convert said parallel formatted eight-bit digital receive signals into single-ended audio band signals;

a receive filter connected to said EXDAC arranged to selectively pass specific bands of said single-ended audio receive signals output by said EXDAC;

a receive summer circuit connected to said receive filter and to said impedance section, said receive summer circuit arranged to sum the single-ended audio receive signals output from said receive filter with the audio band feedback signal output by said impedance section; and a receive amplifier connected to said receive summer circuit and to said subscriber line interface circuit, said receive amplifier converting said single-ended audio receive signals into differential voltage audio receive signals for transmission to said subscriber line interface circuit and to said subscriber instrument.

4. The hybrid balance and combination codec filter circuit as claimed in claim 3, wherein said hybrid balance and echo cancelation section comprises;

a first order switched-capacitor filter clocked at 8 KHZ, connected between said receive filter and said receive summer circuit;

a first order switched-capacitor low pass filter clocked at 256 KHZ connected between said first order switched-capacitor filter and said analog loopback summing amplifier, said switched-capacitor filter and said switched-capacitor low pass filter receiving a portion of said single-ended audio receive signals output from said receive filter and reshaping said received single ended audio receive signals into an output signal which is equal in amplitude but opposite in phase to said reflected differential voltage audio receive signals applied to said transmit amplifier from said subscriber loop.

5. The hybrid balance and combination codec filter circuit as claimed in claim 1, wherein said hybrid balance and echo cancellation section further includes means for receiving a plurality of combinations of logic control signals from said digital switching network for selectively operating said hybrid balance and echo cancellation section to function in a plurality of specific subscriber line interface tip and ring lead impedance terminations.

6. The hybrid balance and combination codec filter circuit as claimed in claim 5, wherein said hybrid balance and echo cancellation section in response to a first combination of logic control signals operates in loaded tip and ring lead terminations.

7. The hybrid balance and combination codec filter circuit as claimed in claim 5, wherein said hybrid balance and echo cancellation section in response to a second combination of logic control signals operates in non-loaded tip and ring lead terminations.

8. The hybrid balance and combination codec filter circuit as claimed in claim 5, wherein said hybrid balance and echo cancellation section in response to a third combination of logic control signals operates in 900 OHM+2.16 $\mu$F tip and ring lead terminations.

9. The hybrid balance and combination codec filter circuit as claimed in claim 4, wherein said impedance section includes an impedance network connected between said transmit amplifier and said receive summer circuit, said impedance network arranged to synthesize said source impedance for said subscriber line interface circuit by feeding the transmit amplifier single-ended audio transmit signals into said impedance network, wherein the resistance and capacitance of said impedance network is closely matched to the gains of said transmit and receive amplifiers, an said source impedance developed by said impedance network is summed to the single-ended audio receive signals input to the receive summer circuit, whereby, said differential voltage audio receive signals output from said receive amplifier to said subscriber line interface circuit includes a source impedance of 900 OHM+2.16 $\mu$F.

10. The hybrid balance and combination codec filter circuit as claimed in claim 9, wherein said hybrid balance and combination codec filter circuit further includes a timing generator arranged to develop and 8 KHZ and a 256 KHZ clock signal from a master clock signal provided by said subscriber line interface circuit, whereby, said 256 KHZ clock signal is applied to said transmit filter, said receive filter and said hybrid balance first order switched-capacitor low pass filter, and said 8 KHZ clock signal is applied to said transmit filter, said receive filter and said hybrid balance first order switched-capacitor filter.

11. The hybrid balance and combination codec filter circuit as claimed in claim 9, wherein said analog loopback summing amplifier is further arranged to receive a logic control signal which opens the analog path between said transmit amplifier and said summing junction of said analog loopback summing amplifier, and in response to the application of said logic control signal, PCM signals input to said receive register from said digital switching network is converted into single-ended audio receive signals and applied to said analog loopback summing amplifier via said hybrid balance section, whereby, said single-ended audio receive signals are converted back to PCM signals and transmitted back to said digital switching network.

* * * * *